(12) United States Patent
Dh et al.

(10) Patent No.: US 11,086,669 B2
(45) Date of Patent: Aug. 10, 2021

(54) SYSTEM AND METHOD FOR SORTING AND SCHEDULING WORKFLOWS

(71) Applicant: EMC IP Holding Company LLC, Hopkinton, MA (US)

(72) Inventors: Swaroop Shankar Dh, Bangalore (IN); Gururaj Kulkarni, Bangalore (IN); Chandrakantha T. Nagaraja, Bengaluru (IN); Mahesh Reddy Appireddygari Venkataramana, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 142 days.

(21) Appl. No.: 16/526,329

(22) Filed: Jul. 30, 2019

(65) Prior Publication Data

US 2021/0034410 A1   Feb. 4, 2021

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5038* (2013.01)

(58) Field of Classification Search
CPC ............................ G06F 9/4881; G06F 9/5038
See application file for complete search history.

(56) References Cited

U.S. PATENT DOCUMENTS

| 6,321,366 | B1 * | 11/2001 | Tseng | G06F 30/33 326/94 |
| 2012/0278513 | A1 * | 11/2012 | Prevost | G06F 9/5038 710/39 |
| 2018/0300174 | A1 * | 10/2018 | Karanasos | G06F 9/4881 |

* cited by examiner

*Primary Examiner* — Wissam Rashid
(74) *Attorney, Agent, or Firm* — Chamberlain, Hrdlicka, White, Williams & Aughtry

(57) ABSTRACT

In general, embodiments of the invention relate to processing backup jobs. The processing of backup jobs includes ordering a first plurality of jobs in a priority queue, where the first plurality of jobs is associated with a first workflow, ordering a second plurality of jobs in the priority queue, where the second plurality of jobs is associated with a second workflow, where the first workflow is associated with a higher weight than the second workflow, where the first plurality of jobs is scheduled to be serviced before the second plurality of jobs, and initiating servicing of the first plurality of jobs.

15 Claims, 5 Drawing Sheets

SYSTEM AND METHOD FOR SORTING AND SCHEDULING WORKFLOWS

BACKGROUND

Computing devices may include any number of internal components such as processors, memory, and persistent storage. Each of the internal components of a computing device may be used to generate data. The process of generating, storing, and scheduling data may utilize computing resources of the computing devices such as processing and storage. The utilization of the aforementioned computing resources to generate backups may impact the overall performance of the computing resources.

SUMMARY

In general, in one aspect, the invention relates to a method for processing backup jobs, the method comprises ordering a first plurality of jobs in a priority queue, wherein the first plurality of jobs is associated with a first workflow, ordering a second plurality of jobs in the priority queue, wherein the second plurality of jobs is associated with a second workflow, wherein the first workflow is associated with a higher weight than the second workflow, wherein the first plurality of jobs is scheduled to be serviced before the second plurality of jobs, and initiating servicing of the first plurality of jobs.

In general, in one aspect, the invention relates to a non-transitory computer readable medium (CRM) storing instructions for processing backup jobs, the instructions comprising functionality for: ordering a first plurality of jobs in a priority queue, wherein the first plurality of jobs is associated with a first workflow, ordering a second plurality of jobs in the priority queue, wherein the second plurality of jobs is associated with a second workflow, wherein the first workflow is associated with a higher weight than the second workflow, wherein the first plurality of jobs is scheduled to be serviced before the second plurality of jobs, and initiating servicing of the first plurality of jobs.

In general, in one aspect, the invention relates to a system, comprising a processor, a scheduler, and a priority queue, wherein the scheduler when, executed by the processor enables the scheduler to perform a method, the method comprising: ordering a first plurality of jobs in the priority queue, wherein the first plurality of jobs is associated with a first workflow, ordering a second plurality of jobs in the priority queue, wherein the second plurality of jobs is associated with a second workflow, wherein the first workflow is associated with a higher weight than the second workflow, wherein the first plurality of jobs is scheduled to be serviced before the second plurality of jobs, and initiating servicing of the first plurality of jobs.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
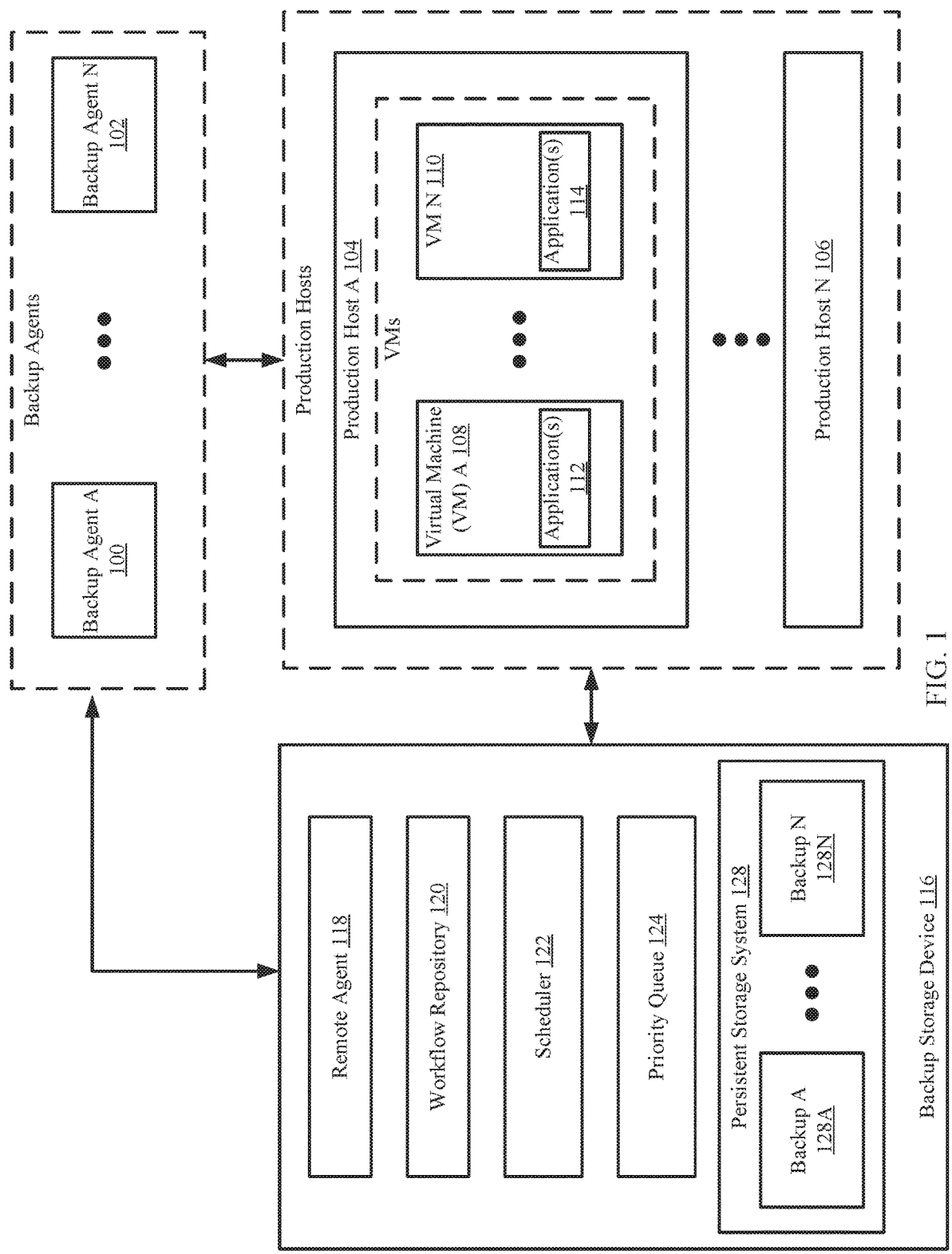
FIG. 1 shows a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to processing jobs associated with backup workflows (also referred to as workflows). More specifically, embodiments of the invention relate to obtaining workflow properties of workflows associated with specific applications, where the applications are to be backed up. The workflows may then be assigned workflow weights based on the workflow properties. The jobs (also referred to as backup jobs) associated with the weighted workflows are then placed in an order within a priority queue for processing, the specific order of the jobs within the priority queue at a given point in time is based on the associated workflow weights, individual job priorities, and individual job aging values. The ordering of the priority queue may be dynamically updated in response to jobs being processed, new jobs being added to the priority queue, and updates to the job aging values.

FIG. 1 shows an example system in accordance with one or more embodiments of the invention. The system includes backup agents (100, 102), production hosts (104, 106), and a backup storage system (116). The system may include additional, fewer, and/or different components without departing from the invention. Each component may be operably connected via any combination of wired and/or wireless connections. Each component illustrated in FIG. 1 is discussed below.

In one or more embodiments of the invention, the backup agents (100, 102) perform backup operations of virtual machines. The backup agents (100, 102) may each perform a backup operation as assigned by the backup storage system. The backup operation may include obtaining data associated with a VM and generating a copy of the data and storing it in a backup format in the backup storage system. The backup agents may perform the backup operations in accordance with the workflows and/or jobs associated with the workflows. The backup agents may include functionality to obtain the workflow properties (described below) for the workflows associated with a given production host and/or virtual machine. While the backup agents are shown as being external to the production hosts, the backup agents may reside on the production hosts and/or within the virtual machines on the production hosts without departing from the invention.

Figure 5:
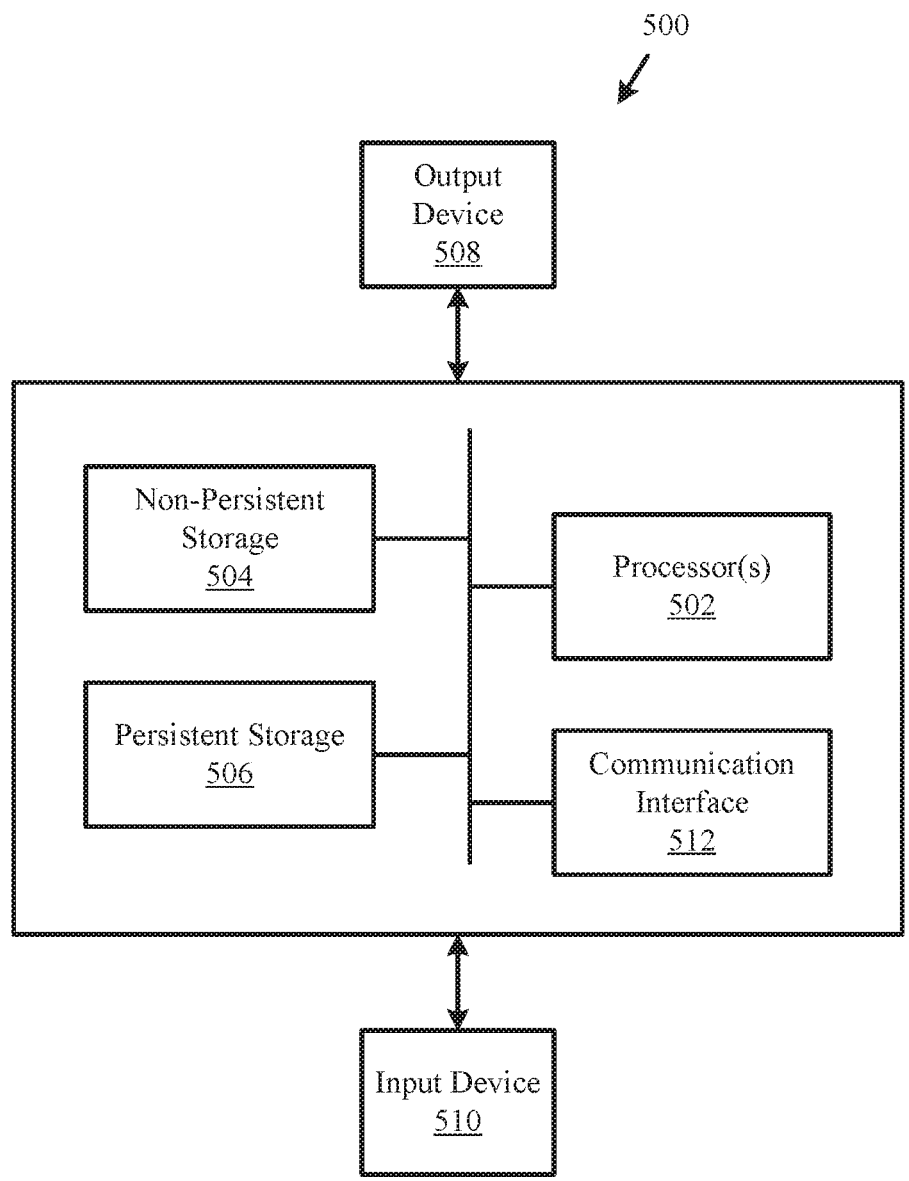
FIG. 5 shows a diagram of a computing device in accordance with one or more embodiments of the invention.

In one or more embodiments of the invention, the backup agents (100, 102) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent described throughout this application and/or all, or a portion thereof.

In one or more embodiments of the invention, the backup agents (100, 102) are implemented as a logical device. The logical device may utilize the computing resources of any number of computing devices and thereby provide the functionality of the backup agents.

In one or more embodiments of the invention, the production hosts (104, 106) host virtual machines (VMs) (108, 110). The virtual machines (108, 110) may be logical entities executed using computing resources (not shown) of the production hosts. Each of the virtual machines (108, 110) may be performing similar or different processes. In one or more embodiments of the invention, the virtual machines (108, 110) provide services to users, e.g., clients (not shown). For example, the virtual machines (108, 110) may host instances of databases, email servers, and/or other applications (112, 114). The virtual machines may host other types of applications without departing from the invention.

In one or more of embodiments of the invention, the virtual machines (108, 110) are implemented as computer instructions, e.g., computer code, stored on a persistent storage (e.g., on a production host)) that when executed by a processor(s) of the production host cause the production host to provide the functionality of the virtual machines.

In one or more embodiments of the invention, the production host (104, 106) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host described throughout this application.

In one or more embodiments of the invention, the production host (104, 106) is implemented as a logical device. The logical device may utilize the computing resources of any number of computing devices and thereby provide the functionality of the production host described throughout this application.

In one or more embodiments of the invention, the backup storage system (116) manages the backups of virtual machines (108, 110) hosted by the production hosts (104, 106). The backup storage system (116) may manage the backups by issuing jobs in accordance with the ordering in the priority queue. To perform the aforementioned functionality, the backup storage system (116) includes a remote agent (118), a workflow repository (120), a priority queue (124), a scheduler (122) that is configured to order the jobs in the priority queue (124) using the data stored in the workflow repository, and a persistent storage system (128).

The backup storage system (116) may include additional, fewer, and/or different components without departing from the invention. Each component of the backup storage system (116) is discussed below.

In one or more embodiments of the invention, the remote agent (118) initiates the monitoring process on the backup agent (100, 102) of an application (112, 114) associated with a workflow to determine workflow properties. The workflow properties may include, but are not limited to, application type, application version, size of data currently associated with the application that needs to backed up, and a read sample performance (e.g., an rate at which data associated with the application can be read). The remote agent may also include functionality to store the aforementioned data and/or information in the workflow repository. In addition, the remote agent may include functionality to interact with the backup agents in order to perform all or a portion of the backup workflows.

In one or more embodiments of the invention, remote agent (118) is a hardware device including circuitry. The remote agent (118) may be, for example, a digital signal processor, a field programmable gate array, or an application specific integrated circuit. The remote agent (118) may be other types of hardware devices without departing from the invention.

In one or more embodiments of the invention, the remote agent (118) is implemented as computing code stored on a persistent storage that when executed by a processor of the backup storage system (116) performs the functionality of remote agent (118). The processor may be a hardware processor including circuitry such as, for example, a central processing unit or a microcontroller. The processor may be other types of hardware devices for processing digital information without departing from the invention.

In one or more embodiments of the invention, the workflow repository (120) stores the workflow properties, the workflow weight, the job priority, and the job aging values. The workflow repository is volatile and/or persistent storage in the backup storage device that includes a data structure(s) to track the workflow properties, the workflow weight, the job priority, and the job aging values.

In one or more embodiments of the invention, the scheduler (122) obtains the workflow properties from the workflow repository, and determines the workflow weight based on the workflow properties. The scheduler may further populate the priority queue based on their workflow, weight, priority, and/or job aging values. Additional detail about the operation of the scheduler is provided in FIGS. 3-4.

In one or more embodiments of the invention, scheduler (122) is a hardware device including circuitry. The scheduler (122) may be, for example, a digital signal processor, a field programmable gate array, or an application specific integrated circuit. The scheduler (122) may be other types of hardware devices without departing from the invention.

In one or more embodiments of the invention, the scheduler (122) is implemented as computing code stored on a persistent storage that when executed by a processor of the backup storage system (116) performs the functionality of scheduler (122). The processor may be a hardware processor including circuitry such as, for example, a central processing unit or a microcontroller. The processor may be other types of hardware devices for processing digital information without departing from the invention.

In one or more embodiments of the invention, the priority queue (124) includes a queue of the ordered jobs that are received from the scheduler. The priority queue may be implemented using any data structure(s) that is stored in volatile and/or persistent storage of the backup storage device.

In one or more embodiments of the invention, the persistent storage system (128) is a system of persistent storage devices that store any number of backups (128A, 128N). In one or more embodiments of the invention, a backup (128A, 128N) is a copy of data associated with a virtual machine. The backup (128A, 128N) may include references to the data that may be used to access the data from the persistent storage system (128). A backup may further include additional data that enables the backup storage device (116) to restore a virtual machine (or a portion of data associated with the virtual machine) associated with the backup from any production host (104, 106).

In one or more embodiments of the invention, each backup (128A, 128N) is associated with all data and/or applications of a virtual machine (108, 110) at a specific point in time. For example, a first backup may include all data and/or applications of a first virtual machine at a point in time T1. A second backup may include all data and/or applications of the first virtual machine at a point in time T2.

In one or more embodiments of the invention, each of the persistent storage system (128) includes magnetic memory devices, optical memory devices, solid state memory devices, phase change memory devices, any other suitable type of persistent memory device, or any combination thereof.

In one or more embodiments of the invention, the backup storage device (116) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device described throughout this application.

Figure 2:
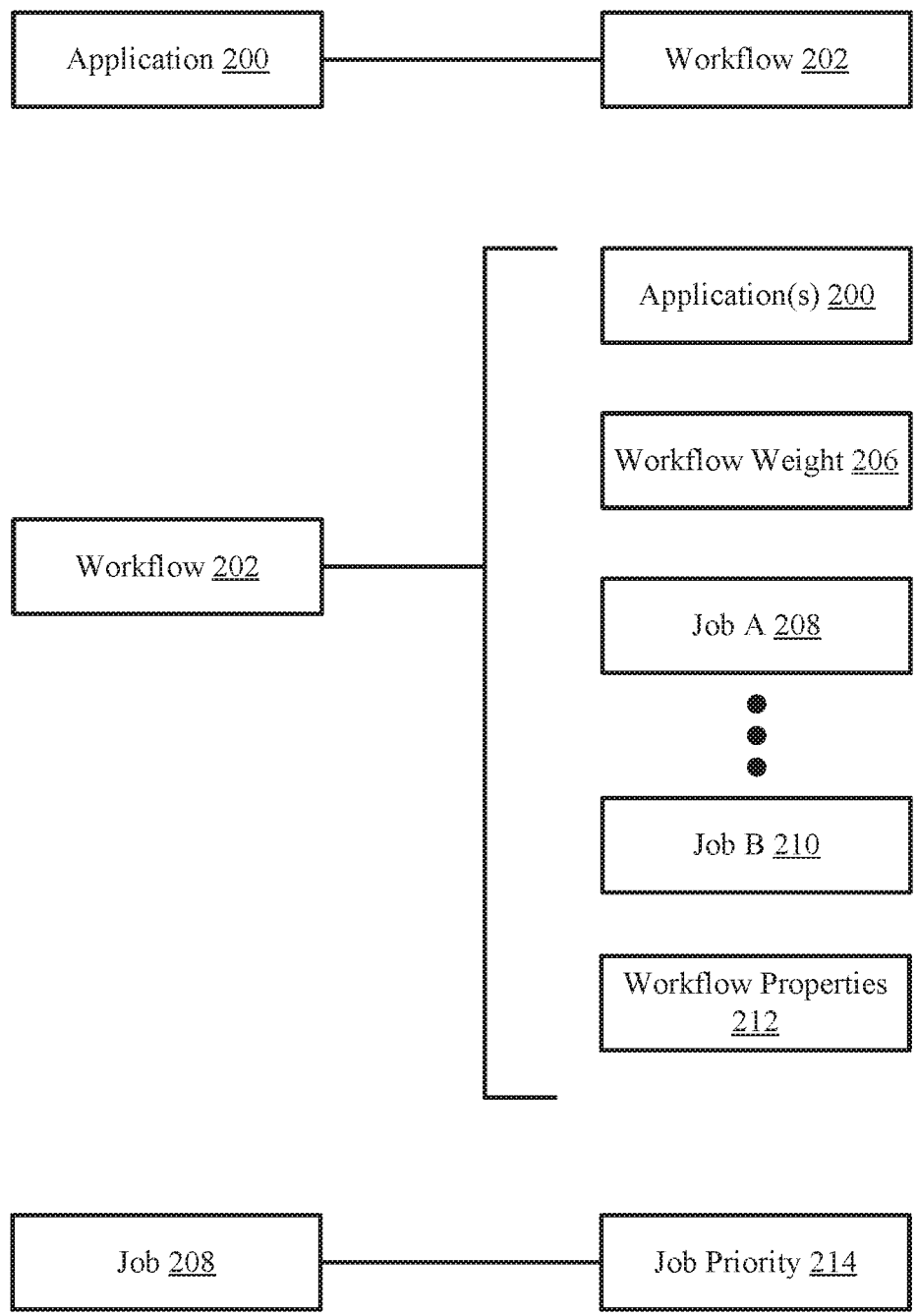
FIG. 2 shows a relational diagram of various components in accordance with one or more embodiments of the invention.

FIG. 2 shows a relational diagram between the application, workflow, and jobs in accordance with one or more embodiments of the invention. In one embodiment of the invention, the workflow repository includes one or more data structures, which are used to track the relationships shown in FIG. 2.

In one or more embodiments of the invention, each application (200) is associated with a workflow (202). The workflow is used to backup data received from the application (200). The workflow corresponds to the set of jobs (described below) that need to be performed in order to back up the application (200). There is one workflow associated with each application (200). However, multiple applications may be associated with a single workflow (i.e., multiple applications may reuse a single workflow and/or the same workflow may be performed for multiple different applications).

In one or more embodiments, each workflow (202) may be associated with one or more application(s) (200), a workflow weight (206), jobs (208, 210), and workflow properties (212).

In one or more embodiments of the invention, the workflow properties (212) are obtained by the remote agent from one or more backup agents. The workflow properties (212) may be segregated into application type, application version, size of data currently associated with the application that needs to be backed up, and a read sample performance and stored into the workflow repository. The workflow properties are not limited to the aforementioned properties. Further, the remote agent may periodically receive updated values/information from the backup agents related to the one or more workflow properties.

In one or more embodiments of the invention, the workflow weight (206) is assigned by the scheduler based on the workflow properties (212). Thereafter, the workflow weight (206) is stored in the workflow repository. The initial workflow weight of the workflow may be determined in accordance with FIG. 3. The workflow weight may dynamically change (or be updated) in accordance with FIG. 4. The workflow weight may be a numeric value (e.g., a value between 0 and 100) or a qualitative value (e.g., critical, medium, non-critical) that specifies the urgency at which a given workflow should be performed. For example, a critical workflow should be performed before a non-critical workflow.

In one or more embodiments of the invention, each workflow is associated with one or more jobs (208, 210). More specifically, a workflow specifies a set of jobs and, in certain embodiments, the order in which the set of jobs each need to be performed. In this context, a job corresponds to individual set of actions/operations to be performed by e.g., the backup agents, the remote agent, the backup storage device, etc.

In one embodiment of the invention, each job (208, 210) is associated with a job priority (214). The jobs priorities (214) may be set by a user (e.g., an administrator) and specify the importance of the job. For example, a job priority may be high, medium, or low. The job priorities are not limited to the aforementioned example. In one embodiment of the invention and, as discussed below, the workflows are ordered in the priority queue based the weight of the workflow. Additionally, the jobs associated with the workflow are ordered based on their priority of high, medium, and low, where the high priority jobs are order before the medium and low priority jobs.

Though not shown in FIG. 2, each job may be associated with a timestamp or counter value that specifies when the job added to the priority queue. The timestamp or counter value may be used to determine job aging values (described below). The job aging values are used to track how long a given job is in a priority queue to ensure that the job is ultimately processed. For example, if a job is initially a low priority job, then it would initially not be processed in favor of a higher priority jobs. However, over time the low priority job's aging value would increase thereby ensuring that it would be serviced. Additional detail is provided below.

Figure 3:
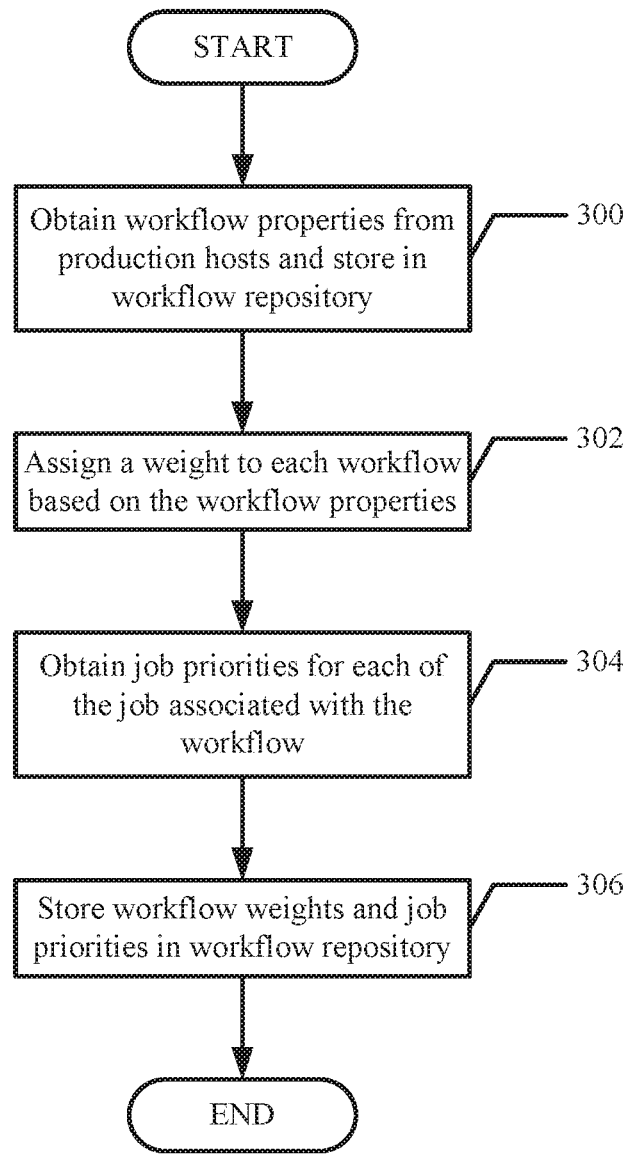
FIG. 3 shows a flowchart for determining the criticality of a workflow in accordance with one or more embodiments of the invention.
Figure 4:
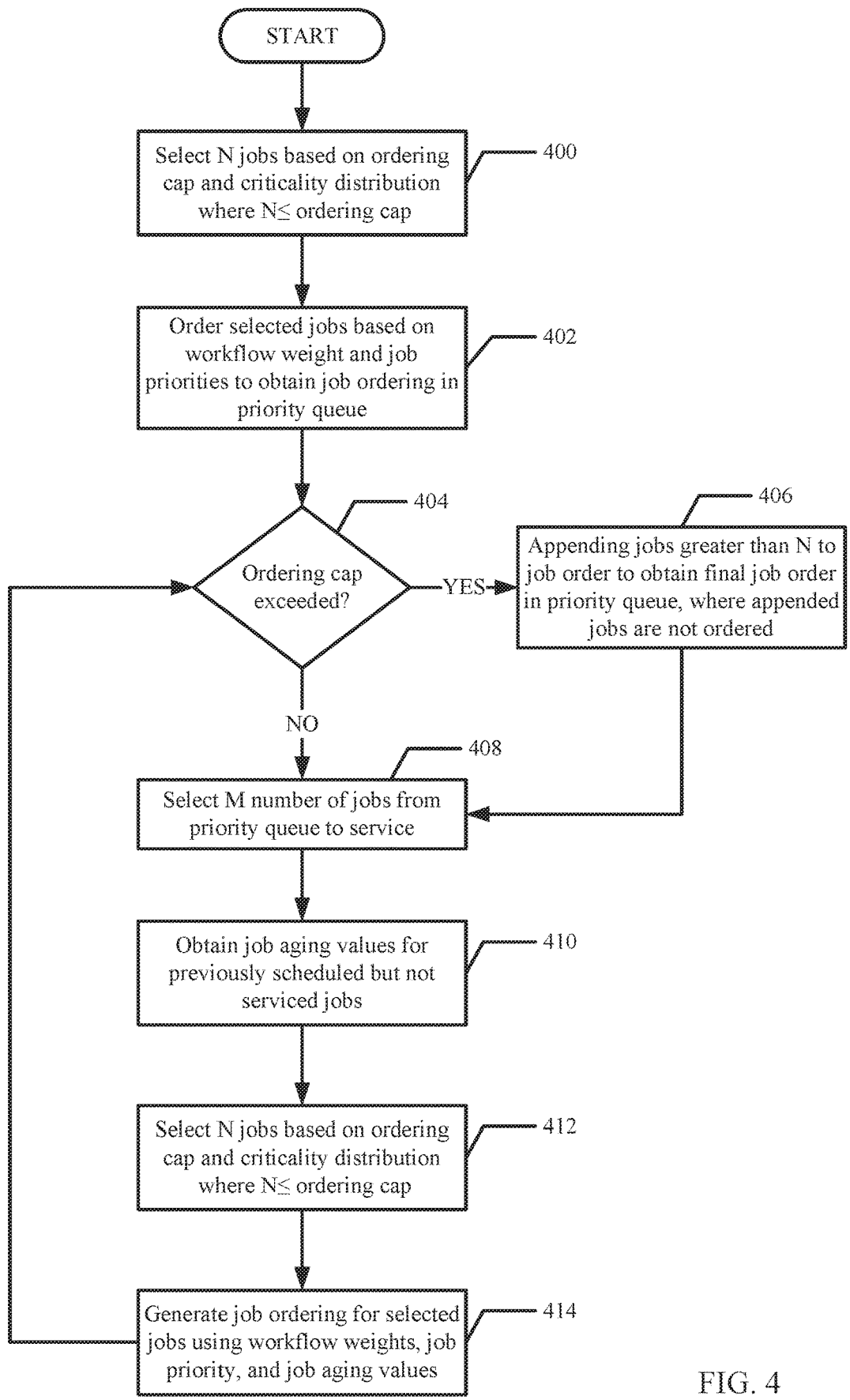
FIG. 4. shows a flowchart for ordering and processing jobs associated with a workflow in a priority queue in accordance with one or more embodiments of the invention.

FIGS. 3-4 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3-4 may be performed in parallel with any other steps shown in FIGS. 3-4 without departing from the scope of the invention.

FIG. 3 shows a flowchart for obtaining workflow properties in accordance with one or more embodiments of the invention. The flowchart specifies a method that obtains workflow properties from production hosts. The workflow properties and job priorities are stored in a workflow repository. The method shown in FIG. 3 may be performed, for example, by a backup storage device (or one or more components thereon). Other components of the system illustrated in FIG. 1 may perform the method of FIG. 3 without departing from the invention.

Turning to FIG. 3, in step 300, workflow properties are obtained from the production hosts by, e.g., the remote agent, and stored in the workflow repository. In one embodiment of the invention, the remote agent may send a request to the backup agents to provide workflow properties associated with the one or more applications executing on one or more production hosts. The request may specify, e.g., the name of an application. In response to the request, the backup agents obtain workflow properties associated with the applications. The backup agents may query the applications, use application programming interfaces (APIs) associated with the applications and/or use any other method or mechanism for obtaining the workflow properties. The workflow properties may be stored in a per-application per-workflow basis.

In step 302, a workflow weight is assigned to each workflow based on the workflow properties. The workflow weight may be determined using heuristics, which may be dynamically changed, implemented by, e.g., the scheduler. The heuristics may apply different weights to each of the workflow properties in order generate a workflow weight.

For example, the heuristics may heavily weight the application type as well as the reading sample performance, while less heavily weighting application version. The invention is not limited to the aforementioned example.

In step 304, job priorities are obtained for each job associated with a workflow. The job priorities may be obtained from an administrator or from another external source.

In step 306, workflow weights and job priorities are stored in a workflow repository.

The method shown in FIG. 3 may be repeated periodically in order to obtain updated workflow properties, which may result in updated workflow weights. The scheduler uses the updated workflow weights and job priorities in order to populate the priority queue.

FIG. 4 shows a flowchart for ordering jobs in accordance with one or more embodiments of the invention. The flowchart specifies a method that orders jobs based on workflow weight and job priorities in a priority queue. The jobs are serviced based upon the final job order within the priority queue. The scheduler may perform all or a portion of the method shown in FIG. 4. Other components of the system illustrated in FIG. 1 may perform the method of FIG. 4 without departing from the invention.

Turning to FIG. 4, in step 400, N number of jobs are selected for priority ordering. More specifically, the scheduler identifies the current number of workflows to be performed and then identifies the jobs associated with each of the workflows. For example, the scheduler may identify workflow A with six jobs, workflow B with 11 jobs, and workflow C with three jobs. In this example, there would be a total of 20 jobs to schedule. In one embodiment of the invention, only N number of jobs of the total number of jobs are selected for priority ordering and any jobs in excess of N (also referred to the ordering cap) are not priority order (i.e., not ordered in accordance with step 402). For example, if there are 200 jobs and N=100, then only 100 of the 200 jobs are selected for priority ordering. The value N may vary based on the implementation of the invention.

The selection of the N number of jobs out of the set of jobs to be scheduled may be performed randomly and/or based on the associated workflow weights. In one embodiment of the invention if workflow weights are used, then the scheduler may select the N jobs in order to obtain a distribution of different weighted workflows (also referred to as a criticality distribution). For example, if the criticality distribution is 5:3:2, then approximately 50% of the N jobs are associated with a critical weight, approximately 30% of N jobs are associated with a medium weight, and approximately 20% of the jobs are associated with a non-critical weight. The invention is not limited to the aforementioned example. The use of the criticality distribution to select the N jobs to schedule attempts to ensure that not only the critical jobs are selected for priority ordering. If only the critical jobs are selected for priority ordering, there is a chance that medium and non-critical jobs will never be priority ordered and, as such, may never be serviced.

As discussed above, each job is associated with a workflow. Accordingly, when jobs are selected as part of the N jobs, the jobs are selected on a per-workflow basis. For example, if workflow A is associated with five jobs, then all five jobs are selected as part of the N jobs. In one or more embodiments of the invention, the jobs associated with a workflow are not split such that some of the jobs associated with a workflow are priority ordered others are not priority ordered.

If there are less then N jobs to be scheduled, then all jobs are scheduled based on the priority order (as described in step 402).

Continuing with the discussion of FIG. 4, in step 402, N jobs are priority ordered (or ordered) based on the associated workflow weights and job priorities. In this embodiment, step 402 corresponds to the first time the scheduler is operating and, as such, there are no job aging values to take into account. However, after the initial scheduling, job aging values may also be taken into account (see step 412).

The N jobs are initially ordered based on the workflow weight associated with the workflow. For example, if workflow A has a workflow weight of 75 and workflow B has a workflow weight of 50, then the jobs associated with workflow A are scheduled prior to the jobs of workflow B. The workflow weights provide the first level of ordering, while the job priorities may provide a second level of ordering. Specifically, the jobs associated with a given workflow may be ordered from highest to lowest priority. For example, if workflow A has the following jobs: J1 (High Priority), J2 (High Priority), J3 (Low Priority), J4 (Low Priority), J5 (High Priority), J6 (Medium Priority), then the jobs may be ordered as follows: J1, J2, J5, J6, J3, J4.

The result at the end of step 402 job order of up to N jobs, which are grouped by workflow. The jobs may be stored in priority queue based on the job order.

In step 404, a determination is made about whether there were more than N jobs to be scheduled. If there are more than N jobs to the scheduled, the process proceeds to step 406; otherwise the process proceeds to step 408.

In step 406, the jobs greater than N are appending to the job order determined in step 402. The jobs appended to the job order are not priority ordered; rather, they may be appended in any order on a per-workflow basis (i.e., grouped per workflow). The jobs added in step 406 are stored in the priority queue sequentially after the jobs stored in step 404.

In one embodiment of the invention, when a job is added to the priority queue (in step 402, 406, or 414), a timestamp or counter value is associated with the job. The timestamp or counter value is used in step 410.

In step 408, M number of jobs (which may be less than, equal to N, or greater than N) is selected from the priority queue for servicing. In one embodiment of the invention, the priority queue is a first-in-first-out (FIFO) queue and the backup storage device (or more specifically a process executing thereon) selects M jobs from the priority queue in FIFO manner such that the highest priority jobs (which are at the front of the priority queue) are processed first. The processing (or servicing of the jobs) including performing or initiating performance of one or actions related to backing up an application associated with the job. Step 408 may span a period of time in which M number of jobs are serviced.

After the period of time for servicing the M jobs in step 408 expires, then in step 410, job aging values for each of the previously scheduled but unprocessed (or not serviced jobs) are calculated. The job aging values (which are based on the aforementioned counter values or timestamps) take into account the time that has elapsed from when the job was placed in the priority queue and the current time. The job aging value may also take into account time required to perform all or a portion of step 402 and/or the latency associated with the counter (or timestamp mechanism).

In one embodiment of the invention, the job aging value may be used to update the workflow weight of the corresponding workflow. For example, if a workflow initially has a weight of medium and jobs associated with the workflow are not serviced in step 408, then a job aging value for the jobs associated with the workflow may be increased. This may result in the workflow weight being moved from medium to critical. If the workflow weight is changed, then jobs associated with the workflow may: (i) have a higher likelihood of being selected as one of the N jobs selected based on the criticality distribution (which favors critical workflows) and (ii) may be ordered with a higher priority within the N jobs.

In step 412, N number of jobs are selected for priority ordering. The N jobs include any jobs that were ordered in accordance with step 402 (or 414) that were not serviced in step 408 as well some number of (i) newly identified jobs (if any) and (ii) jobs that were scheduled in accordance with Step 406.

For example, assume that initially there were 100 jobs that were ordered in accordance with step 402 and an additional 35 jobs that were scheduled per step 406. In step 408, 85 jobs were serviced. Accordingly, 15 of the original 100 order jobs were not serviced, and 35 of the additional jobs were also not serviced. Further, assume that at step 412 an additional 125 new jobs were identified. Based on the above example, the 100 jobs to be selected for ordering, includes the 15 jobs from the initial 100 job that were previously ordered and then a selection, e.g., based on the critically distribution, of 85 of the remaining 160 jobs.

In step 414, N jobs are priority order (or ordered) based on the associated workflow weights (which may have been updated based on new workflow properties obtained accordance with FIG. 3, which is being periodically performed), job priorities, and job aging values. The ordering of the N jobs occurs in a manner that is substantially the same as step 402 expect that the step 414 takes into account job aging values. For example, if two workflows have the same workflow weight and the same number of jobs with the same job priorities, then jobs associated with the workflow with the higher job aging values are prioritized. In another example, as described above, the workflow weights may be updated based the job aging values of the associated jobs. In this manner, the workflows that have higher job aging values become more critical and, as result, the jobs associated with the workflows are placed closer to the front of the priority queue.

The result at the end of step 414 is a job order of up to N jobs, which are grouped by workflow. The jobs may be stored in priority queue based on the job order. The process then proceeds to step 404.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing systems. More specifically, one or more embodiments of the invention may (1) allow dynamic discovery and weight assignment for workflows through a remote agent; (2) servicing workflows based on the data criticality and aging of the job; and (3) sort the jobs dynamically in the scheduler using a priority queue.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing backup jobs, the method comprising:
    ordering a first plurality of jobs in a priority queue, wherein the first plurality of jobs is associated with a first workflow;
    ordering a second plurality of jobs in the priority queue, wherein the second plurality of jobs is associated with a second workflow, wherein the first workflow is associated with a higher weight than the second workflow, wherein the first plurality of jobs is scheduled to be serviced before the second plurality of jobs;
    initiating servicing of the first plurality of jobs;
    after initiating the servicing of the first plurality of jobs:
        receiving a third plurality of jobs to be placed in the priority queue, wherein the third plurality of jobs is associated with a third workflow;
        in response to receiving the third plurality of jobs, determining that an ordering cap for the priority queue has been reached; and
        in response to the determination, appending the third plurality of jobs to the priority queue, wherein the third plurality of jobs is not ordered prior to the appending.

2. The method of claim 1, wherein a first job of the first plurality of jobs is associated with a first priority and a second job of the first plurality of jobs is associated with a second priority, wherein the first priority is greater than the second priority, and wherein the first job is ordered in the priority queue before the second job.

3. The method of claim 2, wherein a third job of the second plurality of jobs is associated with a third priority, wherein the third priority is greater than the first priority, and wherein the first job and second job are ordered in the priority queue before the third job.

4. The method of claim 1, wherein ordering the first plurality of jobs in the priority queue is based, at least in part, on a workflow property associated with the first workflow.

5. The method of claim 4, wherein the workflow property is at least one selected from a group consisting of application type, application version, size of data, and read sampling performance.

6. A non-transitory computer readable medium (CRM) storing instructions for processing backup jobs, the instructions comprising functionality for:
    ordering a first plurality of jobs in a priority queue, wherein the first plurality of jobs is associated with a first workflow;
    ordering a second plurality of jobs in the priority queue, wherein the second plurality of jobs is associated with a second workflow, wherein the first workflow is associated with a higher weight than the second workflow, wherein the first plurality of jobs is scheduled to be serviced before the second plurality of jobs;
    initiating servicing of the first plurality of jobs;
    after initiating the servicing of the first plurality of jobs:
        receiving a third plurality of jobs to be placed in the priority queue, wherein the third plurality of jobs is associated with a third workflow;
        in response to receiving the third plurality of jobs, determining that an ordering cap for the priority queue has been reached; and
        in response to the determination, appending the third plurality of jobs to the priority queue, wherein the third plurality of jobs is not ordered prior to the appending.

7. The CRM of claim 6, wherein a first job of the first plurality of jobs is associated with a first priority and a second job of the first plurality of jobs is associated with a second priority, wherein the first priority is greater than the second priority, and wherein the first job is ordered in the priority queue before the second job.

8. The CRM of claim 7, wherein a third job of the second plurality of jobs is associated with a third priority, wherein the third priority is greater than the first priority, and wherein the first job and second job are ordered in the priority queue before the third job.

9. The CRM of claim 6, wherein ordering the first plurality of jobs in the priority queue is based, at least in part, on a workflow property associated with the first workflow.

10. The CRM of claim 9, wherein the workflow property is at least one selected from a group consisting of application type, application version, size of data, and read sampling performance.

11. A system, comprising:
    a processor;
    a scheduler; and
    a priority queue,
    wherein the scheduler when, executed by the processor enables the scheduler to perform a method, the method comprising:
        ordering a first plurality of jobs in the priority queue, wherein the first plurality of jobs is associated with a first workflow;
        ordering a second plurality of jobs in the priority queue, wherein the second plurality of jobs is associated with a second workflow, wherein the first workflow is associated with a higher weight than the second workflow, wherein the first plurality of jobs is scheduled to be serviced before the second plurality of jobs;
        initiating servicing of the first plurality of jobs;
        after initiating the servicing of the first plurality of jobs:
            receiving a third plurality of jobs to be placed in the priority queue, wherein the third plurality of jobs is associated with a third workflow;
            in response to receiving the third plurality of jobs, determining that an ordering cap for the priority queue has been reached; and in response to the determination, appending the third plurality of jobs to the priority queue, wherein the third plurality of jobs is not ordered prior to the appending.

12. The system of claim 11, wherein a first job of the first plurality of jobs is associated with a first priority and a second job of the first plurality of jobs is associated with a second priority, wherein the first priority is greater than the second priority, and wherein the first job is ordered in the priority queue before the second job.

13. The system of claim 12, wherein a third job of the second plurality of jobs is associated with a third priority, wherein the third priority is greater than the first priority, and wherein the first job and second job are ordered in the priority queue before the third job.

14. The system of claim 11, wherein ordering the first plurality of jobs in the priority queue is based, at least in part, on a workflow property associated with the first workflow.

15. The system of claim 14, wherein the workflow property is at least one selected from a group consisting of application type, application version, size of data, and read sampling performance.

\* \* \* \* \*